(12) United States Patent
Zhang

(10) Patent No.: US 10,626,776 B2
(45) Date of Patent: Apr. 21, 2020

(54) METHOD AND SYSTEM FOR EXHAUST PARTICULATE MATTER SENSING

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 674 days.

(21) Appl. No.: 15/289,741

(22) Filed: Oct. 10, 2016

(65) Prior Publication Data

US 2018/0100423 A1    Apr. 12, 2018

(51) Int. Cl.
| | | |
|---|---|---|
| *G01N 15/06* | (2006.01) | |
| *F01N 9/00* | (2006.01) | |
| *F01N 13/00* | (2010.01) | |
| *F01N 3/021* | (2006.01) | |
| *F01N 3/02* | (2006.01) | |

(52) U.S. Cl.
CPC .......... *F01N 9/002* (2013.01); *F01N 3/02* (2013.01); *F01N 3/021* (2013.01); *F01N 13/008* (2013.01); *F01N 2550/04* (2013.01); *F01N 2560/05* (2013.01); *F01N 2560/20* (2013.01); *Y02T 10/20* (2013.01); *Y02T 10/47* (2013.01)

(58) Field of Classification Search
CPC ...... F01N 11/00; F01N 2560/05; G01N 15/06
See application file for complete search history.

(56) References Cited

U.S. PATENT DOCUMENTS

| | | |
|---|---|---|
| 5,243,819 A | 9/1993 | Woerner et al. |
| 6,672,132 B1 | 1/2004 | Weyl et al. |
| 8,310,249 B2 | 11/2012 | Paterson |
| 2008/0223110 A1 | 9/2008 | Weyl et al. |
| 2008/0282769 A1 | 11/2008 | Nelson |
| 2010/0107737 A1 | 5/2010 | Krafthefer et al. |
| 2011/0203348 A1 | 8/2011 | Hedayat et al. |
| 2012/0085146 A1 | 4/2012 | Maeda et al. |
| 2015/0253233 A1 | 9/2015 | Brueck et al. |
| 2015/0355066 A1 | 12/2015 | Zhang |
| 2015/0355067 A1 | 12/2015 | Zhang et al. |
| 2016/0076919 A1* | 3/2016 | Murakami ........... G01D 11/245 73/431 |
| 2016/0131013 A1 | 5/2016 | Yi et al. |

* cited by examiner

*Primary Examiner* — Lisa M Caputo
*Assistant Examiner* — Alex T Devito
(74) *Attorney, Agent, or Firm* — Geoffrey Brumbaugh; McCoy Russell LLP

(57) ABSTRACT

Methods and systems are provided for a particulate matter sensor positioned downstream of a diesel particulate filter in an exhaust system. In one example, a particulate matter sensor may include a spherical assembly with an oblong chamber located therein.

6 Claims, 8 Drawing Sheets

METHOD AND SYSTEM FOR EXHAUST PARTICULATE MATTER SENSING

FIELD

The present application relates to sensing particulate matter in an exhaust system.

BACKGROUND/SUMMARY

Engine emission control systems may utilize various exhaust sensors. One example sensor may be a particulate matter sensor, which indicates particulate matter mass and/or concentration in the exhaust gas. In one example, the particulate matter sensor may operate by accumulating particulate matter over time and providing an indication of the degree of accumulation as a measure of exhaust particulate matter levels. The particulate matter sensor may be located upstream and/or downstream of a diesel particulate filter, and may be used to sense particulate matter loading on the particulate filter and diagnose operation of the particulate filter.

One example of a PM sensor is shown by Maeda et al. in US 20120085146 A1. Therein, the particulate matter sensor is attached to the top of an exhaust pipe and housed within a cylindrical protection tube. The PM sensor additionally includes a sensor element that is positioned closer to a center of the exhaust pipe so that the sensor output more reasonably represents an average soot concentration in the exhaust pipe. In addition, the PM sensor includes inlet apertures configured to direct the exhaust into the sensor and towards the sensor element. Herein, the sensor element is positioned closer to the inlet holes to allow the sensor element to capture more of the incoming particulates.

However, the inventors have recognized potential issues with such sensor configurations. As one example, such an arrangement may make the sensor element more vulnerable to being contaminated by water droplets in the exhaust condensing at or near the inlet apertures. In such sensor configurations, additional protective coating may be required to protect the soot sensor element from direct impingement of larger particulates and water droplets. Adding additional protective layer may reduce the electrostatic attraction between the charged soot particles and the electrodes of the sensor element and may lead to reduced soot sensor sensitivity. With reduced sensitivity, the soot sensor may not be able to determine the leakage of the particulate filter in a reliable way. Thus, errors in the sensor may lead to a false indication of DPF degradation and unwarranted replacement of functioning filters.

On the other hand, if the sensor is mounted at the bottom of the exhaust pipe, as shown by Paterson in U.S. Pat. No. 8,310,249 B2, water condensing at the bottom of the exhaust pipe may overflow into the sensor element thereby contaminating the sensor element. Such contamination of the sensor element may lead to fluctuations in the output of the sensor, thereby decreasing the accuracy of estimating particulate loading on the particulate filter.

The inventors herein have recognized the above issues and identified an approach to at least partly address the issues. In one example approach, a particulate matter sensor assembly comprising a spherical assembly, an inner device positioned within an outer device of the spherical assembly, offset with a geometric center of the outer device, and a sensor element located on an outer surface of the inner device, proximal to a narrowest passage between the spherical assembly and the oblong chamber. In this way, by separating the sensor element from an interior chamber of the inner device, issues related to water droplets and larger contaminants impinging on the sensor element and causing fluctuations in the sensor output may be reduced.

As one example, an exhaust particulate matter sensor assembly may be positioned downstream of an exhaust particulate filter in an exhaust pipe. The particulate matter sensor may include a spherical assembly including a flow tube attached to a bottom, downstream end of the assembly relative to a direction of exhaust gas flow, and a sensor element positioned closer to a top end of the assembly. Specifically, the spherical assembly includes hollow spherical misaligned outer and inner devices separated by a gap and/or annular space. A support rod may be installed at the top end of the assembly coupling the assembly to a top of an exhaust pipe.

The flow tube fluidly couples the inner device to the exhaust passage. As such, exhaust gas flows through the oblong chamber before flowing through the annular space located between the outer and inner devices. The inner device is asymmetrically located in the spherical assembly, where geometric centers of the oblong chamber and spherical assembly are off-set. As such, a largest diameter of the oblong chamber corresponds with a narrowest gap of the annular space. The sensor element is positioned on an outer surface of the inner device along its largest diameter. By doing this, exhaust gas flows annularly through the narrowest passage and deposits particulates onto the sensor element before flowing through an outlet of the outer device to the exhaust passage.

In this way, the functioning of the sensor element may be improved and the sensor may be rendered more reliable. In addition, by enabling a more accurate diagnosis of the exhaust particulate filter, exhaust emissions compliance may be improved. This reduces the high warranty costs of replacing functional particulate filters. The exhaust may exit the sensor via the outlet positioned at a bottom of the assembly. The asymmetrical design of the outer and inner devices eliminate manufacture process for specific sensor orientation at the installation and enhance the sensor repeatability.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-4 are shown approximately to scale.

DETAILED DESCRIPTION

Figure 1:
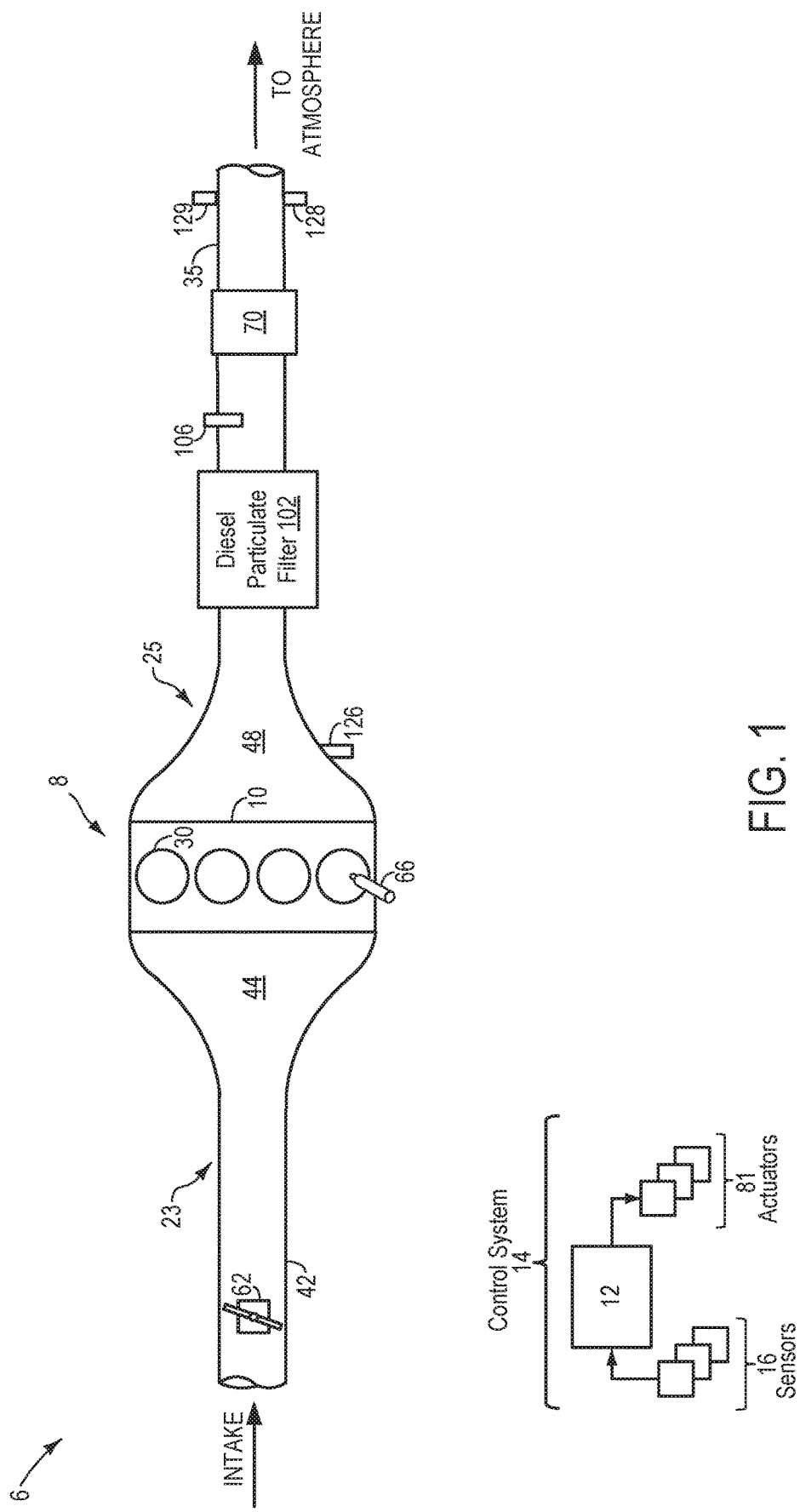
FIG. 1 shows a schematic diagram of an engine and an associated particulate matter (PM) sensor positioned in an exhaust flow.
Figure 2:
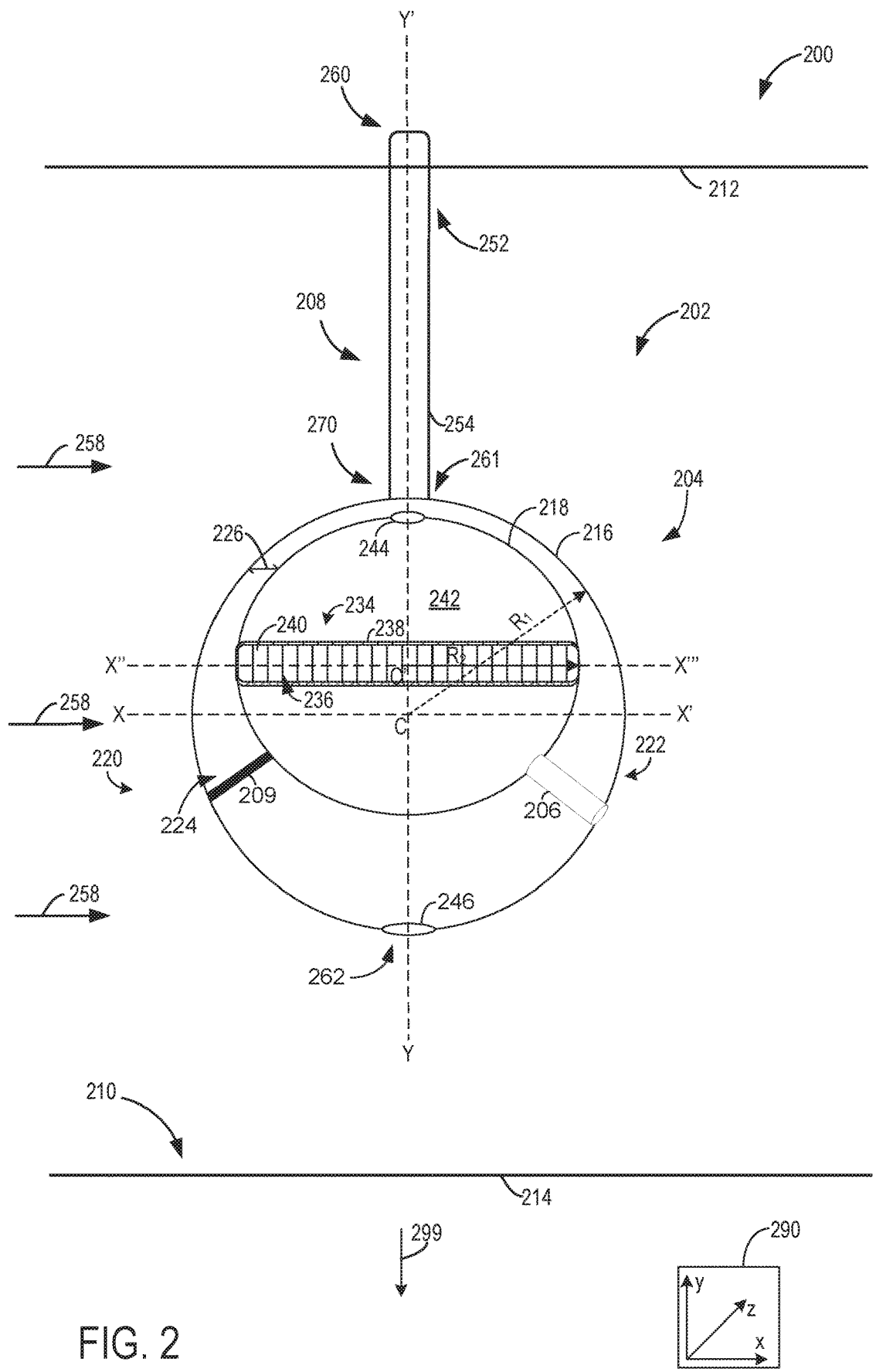
FIG. 2 shows a schematic diagram of the PM sensor including a spherical assembly having a flow tube and a sensor element mounted inside an exhaust pipe via a support rod.
Figure 3:
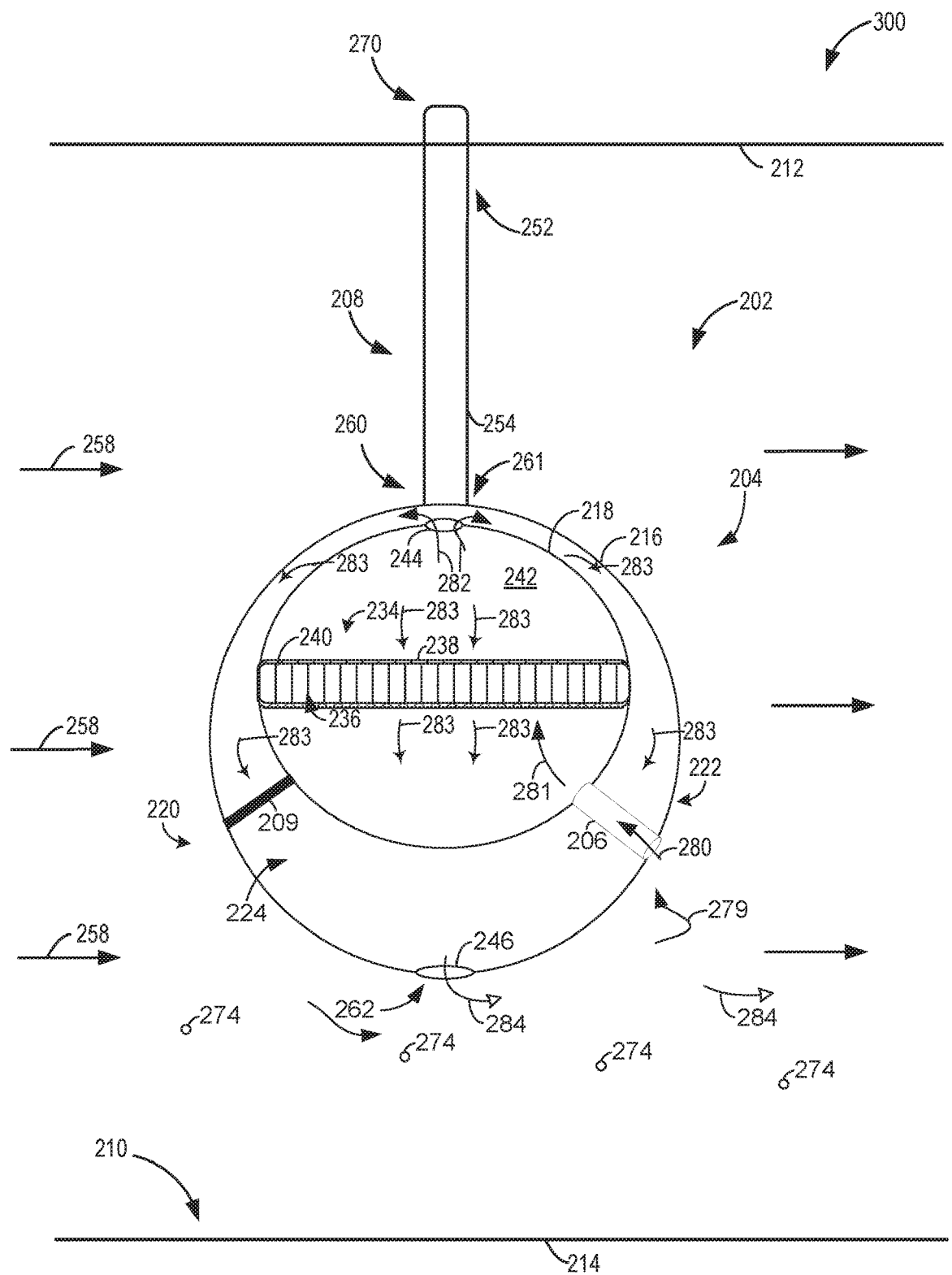
FIG. 3 shows a schematic diagram of the PM sensor showing exhaust flowing into the PM sensor via the flow tube attached to a bottom of the spherical assembly.
Figure 4:
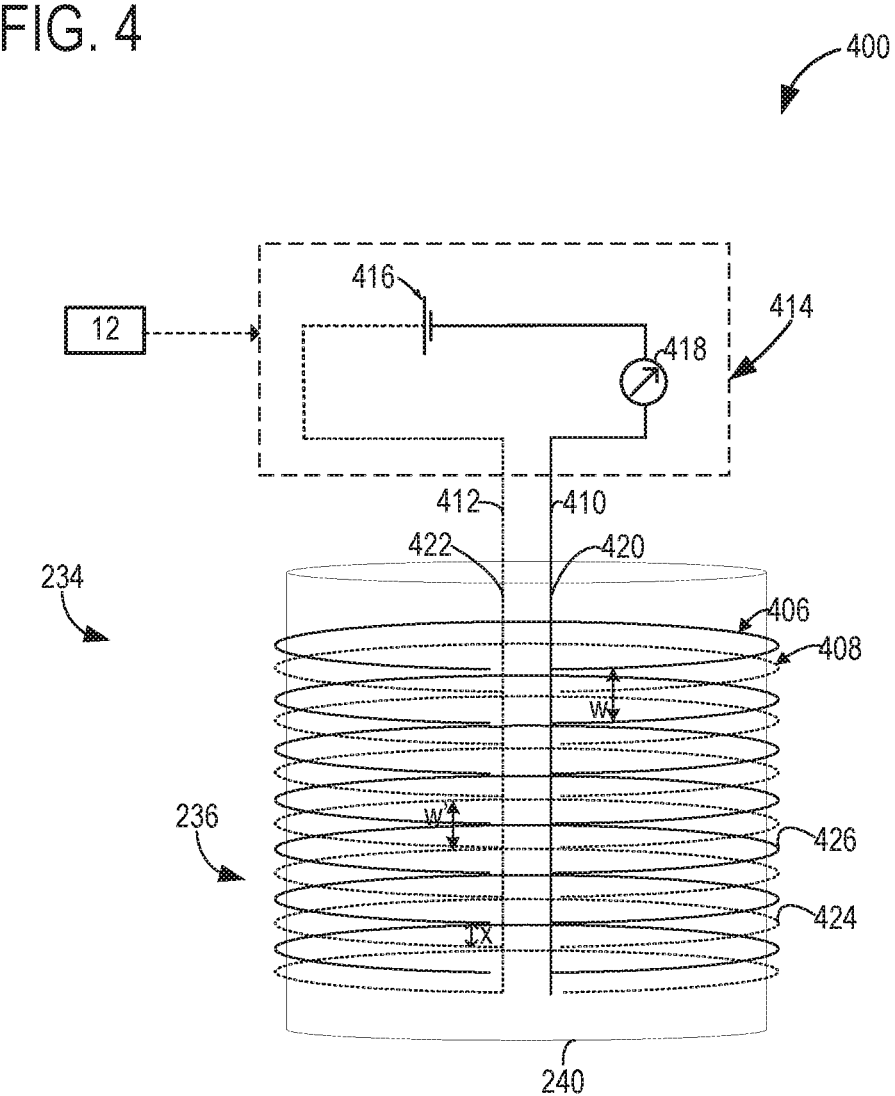
FIG. 4 shows an example layout of circular interdigitated electrodes formed on a first surface of the sensor element.

The following description relates to systems and methods for sensing particulate matter (PM) in an exhaust flow of an engine system, such as the engine system shown in FIG. 1. A PM sensor may be placed in an exhaust passage of the engine system. The PM sensor may include a spherical assembly including a flow tube attached and a support rod attached to diametrically opposite ends of the spherical assembly. The spherical assembly may be mounted to a bottom of the exhaust passage with the help of the support rod. Specifically, the spherical assembly includes an inner spherical device positioned within an outer spherical device and separated by a gap and the flow tube includes an inner tube positioned within an outer tube and separated by a space, as shown in FIG. 2. Further, a cylindrical spherical element may be positioned inside the inner device, and exhaust may be directed towards the sensor element with the aid of a flow tube and holes formed on the inner device as shown in FIG. 3. The sensor element may include interdigitated electrodes formed on a first surface of the sensor element as shown in FIG. 4. Additionally, the sensor element may include heating elements formed on a second, opposite surface as shown in FIG. 4. A controller may be configured to perform a control routine, such as an example routine of FIG. 5 to accumulate particulates in the exhaust across the electrodes of the sensor element. Further, the controller may intermittently clean the PM sensor (FIG. 6) to enable continued PM monitoring. Furthermore, the controller may be configured to perform a routine, such as an example routine of FIG. 7 to regenerate the exhaust particulate filter based on a time between PM sensor regenerations. An example of filter diagnostics is shown in FIG. 8. In this way, the functioning of the PM sensor to estimate the filtering capabilities of the DPF (and thereby to detect DPF leaks) may be increased.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic depiction of a vehicle system 6. The vehicle system 6 includes an engine system 8. The engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere. Throttle 62 may be located in intake passage 42 downstream of a boosting device, such as a turbocharger (not shown), and upstream of an after-cooler (not shown). When included, the after-cooler may be configured to reduce the temperature of intake air compressed by the boosting device.

Engine exhaust 25 may include one or more emission control devices 70, which may be mounted in a close-coupled position in the exhaust. One or more emission control devices may include a three-way catalyst, lean NOx filter, SCR catalyst, etc. Engine exhaust 25 may also include diesel particulate filter (DPF) 102, which temporarily filters PMs from entering gases, positioned upstream of emission control device 70. In one example, as depicted, DPF 102 is a diesel particulate matter retaining system. DPF 102 may have a monolith structure made of, for example, cordierite or silicon carbide, with a plurality of channels inside for filtering particulate matter from diesel exhaust gas. Tailpipe exhaust gas that has been filtered of PM, following passage through DPF 102, may be measured in a PM sensor 106 and further processed in emission control device 70 and expelled to the atmosphere via exhaust passage 35. In the depicted example, PM sensor 106 is a resistive sensor that estimates the filtering efficiency of the DPF 102 based on a change in conductivity measured across the electrodes of the PM sensor. A schematic view 200 of the PM sensor 106 is shown at FIG. 2, as described in further detail below.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust flow rate sensor 126 configured to measure a flow rate of exhaust gas through the exhaust passage 35, exhaust gas sensor (located in exhaust manifold 48), temperature sensor 128, pressure sensor 129 (located downstream of emission control device 70), and PM sensor 106. Other sensors such as additional pressure, temperature, air/fuel ratio, exhaust flow rate and composition sensors may be coupled to various locations in the vehicle system 6. As another example, the actuators may include fuel injectors 66, throttle 62, DPF valves that control filter regeneration (not shown), switch of electric circuit, etc. The control system 14 may include a controller 12. The controller 12 may be configured with computer readable instructions stored on non-transitory memory. The controller 12 receives signals from the various sensors of FIG. 1, processes the signals, and employs the various actuators of FIG. 1 to adjust engine operation based on the received signals and instructions stored on a memory of the controller. As an example, while operating the PM sensor to accumulate soot particulates, the controller may send a control signal to an electric circuit to apply a voltage to the sensor electrodes of the PM sensor to trap the charged particulates onto the surface of the sensor electrodes. As another example, during PM sensor regeneration, the controller may send a control signal to a regeneration circuit to close a switch in the regeneration circuit for a threshold time to apply a voltage to heating elements coupled to the sensor electrodes to heat the sensor electrodes. In this way, the sensor electrodes are heated to burn off soot particles deposited on the surface of the sensor electrodes. Example routines are described herein with reference to FIGS. 5-7.

Turning now to FIG. 2, a schematic view 200 of an example embodiment of a particulate matter (PM) sensor assembly 202 (such as PM sensor 106 of FIG. 1) is shown. The PM sensor assembly 202 may be configured to measure PM mass and/or concentration in the exhaust gas, and as such, may be coupled to an exhaust passage 210 (e.g., such as the exhaust passage 35 shown in FIG. 1), upstream or downstream of a diesel particulate filter (such as DPF 102 shown in FIG. 1).

An axis system 290 comprising three axes, namely an x-axis parallel to the horizontal direction, a y-axis parallel to the vertical direction, and a z-axis perpendicular to both the x- and y-axes, is shown. A direction of gravity 299 is shown with an arrow parallel to the vertical direction.

In the schematic view 200, the PM sensor assembly 202 is disposed inside the exhaust passage 210 with exhaust gases flowing (in a horizontal direction along the X-axis) from downstream of the diesel particulate filter towards an exhaust tailpipe, as indicated by arrows 258. The PM sensor assembly 202 is mounted inside the exhaust passage 210 via a support rod 208. Herein, the PM sensor assembly 202 is spherical in shape. As another example, the assembly may be a hollow elliptical structure positioned within the exhaust passage 210. As shown, the PM sensor assembly 204 and support rod 208 are symmetric about the y-axis.

The support rod 208 may extend along the y-axis in a direction orthogonal to the direction of exhaust gas flow 258. Further, the support rod 208 may include a top end 260 and a bottom end 270. A portion of the top end 260 may be coupled to a top 212 (and not coupled to a bottom 214 of the exhaust passage 210, for example) of the exhaust passage 210. As an example, the portion of the top end 260 of the support rod 208 extending through the top 212 of the exhaust passage 210 may be much smaller than the portion 254 of the support rod 208 remaining inside the exhaust passage 210. The top end 260 of the support rod 208 may be installed in the top 212 of the exhaust passage 210 in a number of ways. For example, the top end 260 of the support rod 208 may be inserted, screwed, or held to the top 212 via additional screws (not shown). The top end 260 is in sealing contact with the top 212. As such, exhaust gas 258 does not escape through intersection between the top end 260 and the top 212 to an engine (e.g., engine 10 in the embodiment of FIG. 1) or an ambient atmosphere.

The bottom end 270 of the support rod 208 may be coupled to a top portion 261 of the spherical assembly 204. As such, the bottom end 270 of the support rod 208 may be closed to prevent exhaust gas escaping through the top portion 261 of the spherical assembly 204. Specifically, the spherical assembly 204 includes a hollow outer spherical device 216 (henceforth referred to as outer device 216) and a hollow inner egg-shaped device 218 (henceforth referred to as inner device 218) positioned concentrically within the outer device 216. The top end 260 of the support rod 208 may be coupled to a top portion 261 of the outer device 216. As a result, the support rod 208 is fluidically coupled to the outer device 216 specifically at the opening formed in the top portion 261 of the outer device 216 and the bottom end 270 of the support rod 208. It may be appreciated that the support rod 208 is not coupled to the inner device 218 but coupled only to the outer device 216.

The outer device 216 is a spherical protection device of radius $R_1$. However, the inner device 218 is an oblong protection device with varying radius, with $R_2$ indicating a greatest radius of the inner device 218. Herein, the inner device 218 is smaller than the outer device 216 (e.g., $R_2<R_1$), and an annular gap 224 and/or annular space 224 is located between the outer 216 and inner 218 devices. The inner device 218 is positioned asymmetrically within the outer device 216 such that the annular gap 224 is non-uniform between the outer 216 and inner 218 devices, with a gap 226 indicating a narrowest portion of the annular gap 224. Herein, gap 226 may also be referred to as narrowest gap 226 and/or narrowest space 226. In this way, the annular space 224 is not symmetric, with a greater portion of its volume being located near a bottom portion 262. The outer device 216 and the inner device 218 comprise off-set centers C and C' along a common central axis Y-Y' that is perpendicular to the direction of exhaust flow (arrow 258) inside the exhaust passage 210. However, the center C is located along a first horizontal axis, X-X', which is below a second horizontal axis, X"-X"', of the center C'. Thus, the center C' of the inner device 218 is closer to the top portion 261 than the center C of the outer device 216. Together the inner device 218 and the outer device 216 form a spherical assembly 204 the PM sensor assembly 202.

As an example, the length of the PM sensor assembly 202 and the radii $R_1$ and $R_2$ of the outer 216 and inner 218 devices of the spherical assembly 204 may be selected such that the spherical assembly 204 may be positioned closer to a center of the exhaust passage 210. In this way, by positioning the sensor assembly close to the center of the exhaust passage 210, the average soot particulate concentration in the exhaust passage 210 may be reasonably represented in the sensor assembly. In one example, the X-X' axis also represents a central axis of the exhaust passage 210. Thus, the sensitivity of the PM sensor assembly 202 may be increased and the sensor may be rendered more reliable. In addition, by enabling a more accurate diagnosis of the exhaust particulate filter, exhaust emissions compliance may be improved. As such, this reduces the high warranty costs of replacing functional particulate filters, exhaust emissions are improved, and exhaust component life is extended.

The inner device 218 is fixed within and spaced away from interior surfaces of the outer device 216 via a flow tube 206 and a stand-off 209 and/or support 209. The stand-off 209 is physically coupled to the outer 216 and inner 218 devices at opposite extreme ends. The stand-off 209 is solid and is impervious (e.g., does not allow) to exhaust gas. Unlike the stand-off 209, which is located adjacent an upstream surface 220 of the outer device 216, a flow tube 206 is located at a downstream surface 222 of the spherical assembly 204. As shown, the upstream surface 220 is to the left of the Y-Y' axis and the downstream surface 222 is to the right of the Y-Y' axis in the embodiment of FIG. 2. The flow tube 206 is physically coupled to the outer 216 and inner 218 devices at opposite extreme ends. Furthermore, the flow tube 206 is hollow and configured to allow exhaust gas to flow therethrough to an interior chamber 242 of the inner device 218. Specifically, exhaust gas flows directly from the exhaust passage 210 to the interior chamber 242 via the flow tube 206 without flowing through the annular space 224. In one example, the flow tube 206 is the only inlet for exhaust gas to enter the spherical assembly 204 from the exhaust passage 210. In this way, both the flow tube 206 and the stand-off 209 rigidly couple the inner device 218 to interior surfaces of the outer device 216, with only the flow tube 206 being configured to admit exhaust gas into the inner device 218.

During cold start of the vehicle, the exhaust may not be warm enough to convert water inside the exhaust pipe into steam (gaseous state), and thus water may continue to remain in the liquid state and collect at the bottom 214 of the exhaust passage 210. By mounting the flow tube 206 on the downstream surface 222 of the outer device 218, the sensor may be protected from water condensing and collecting at the bottom of the exhaust passage due to a momentum of large particulates and/or water droplets being swept by the flow tube 206. This may prevent and/or reduce large particulates from entering the inner device 218.

An inner device outlet 244 fluidly connects the interior chamber 242 of the inner device 218 to the annular space 224. Apart from the inner device outlet 244 and the flow tube 206, the inner device 218 is completely sealed with surfaces being impervious to exhaust gas flow. The inner device outlet 244 is positioned along a top surface of the inner device 218, near the top portion 261. An outer device outlet 246 is located on a bottom surface of the outer device 216, near a bottom portion 262. The inner device outlet 244 and the outer device outlet 246 are both located on the Y-Y' axis. However, the outer device outlet 246 is located in a lower half of the outer device below the X-X' axis and the inner device outlet 244 is located in an upper half of the outer device above the X-X' axis. In this way, exhaust gas flows through an entire height (e.g., diameter) of the annular space 224 along the Y-Y' axis before flowing through the outer device outlet 246. In one example, the outer device outlet 246 comprises a diameter larger than a diameter of the inner device outlet 244. Both the outer 246 and inner 244 device outlets may be circular, oblong, or other shapes configured to flow exhaust gas therethrough.

The exhaust passage 210 is constricted by the spherical assembly 204, resulting in a decrease in static pressure in portions of the exhaust passage 210 adjacent the spherical assembly 204 along the Y-Y' axis. This may produce a partial vacuum, which may flow through the outer device outlet 246, thereby providing a vacuum in the annular space 224. The vacuum may pull some exhaust gas through the flow tube 206 and into the interior chamber 242. However, the vacuum may not be sufficient to reverse a flow direction of large particulates and/or water droplets, as will be described below in FIG. 3.

As such, the outer device 216 may be manufactured as a hollow spherical device with cutouts formed on the bottom portion 262 and the downstream surface 222. In one example, the cutouts are circular in shape. The flow tube 206 may be manufactured as a hollow cylinder and inserted at a cutout of the downstream surface 222 and a cutout of the inner device 218. Alternatively, support rod 208 and stand-off 209 are solid tubes used to support the spherical assembly 204 and the inner device 218, respectively. As described above, the support rod 208 may be sized to extend the spherical assembly 204 to a center of the exhaust passage 210. Alternatively, the stand-of 209 and the flow tube 206 may be sized to asymmetrically position the inner device 218 into the outer device 216.

Similar to the outer device, the inner device 218 may be manufactured as a hollow oblong device with cutouts formed near the top portion 261 and near the downstream surface 222, corresponding to a location of the flow tube 206. The radius of the inner device 218 is uneven, with a greatest radius located along the X"-X'" axis and a smallest radius located along the Y-Y' axis. Near the downstream surface 222, the cutout may admit exhaust gas into the interior chamber 242 of the inner device 218. The cutout near the top portion 261 may expel exhaust gas into the annular space between the outer 216 and inner 218 devices. In this way, the inner device 218 is rigidly suspended in the outer device 216. In addition, the inner device 218 may include a sensor element 234 coupled to an outer surface of the inner device 218.

The sensor element 234 may be along a greatest diameter (e.g., or radius $R_2$). As an example, the sensor element 234 is ring-shaped and wraps around an entire circumference of the inner device 218 along the X"-X'" axis. As such, the inner device 218 may be forcibly slid into the sensor element 234 to prevent sliding and/or separation. The sensor element 234 is located downstream of the narrowest gap 226 of the annular space 224 relative to a direction of exhaust gas flow.

The sensor element 234 includes a substrate 240 having interdigitated electrodes 236 formed on a first surface, and a heating element 238 formed on a second, opposite surface. Said another way, the interdigitated electrodes 236 and the heating element 238 are formed on two opposite sides of the substrate 240, thus separated by a thickness of the substrate 240. As such, the sensor element 234 may be a circular element to take advantage of the oblong shape of the inner device 218. However, the sensor element 234 may be rectangular, square, triangular or the like without deviating from the scope of the invention. For a circular shaped element 234, the interdigitated electrodes 236 may additionally be circular so that there is increased surface area coverage of the electrodes formed on the circular sensor element 234. Various other geometries may alternatively be possible without deviating from the scope of the disclosure. An example geometry includes interdigitated "comb" electrode structure. The soot particulates in the exhaust may be deposited between the interdigitated electrodes as explained with reference to FIG. 4. The sensor element 234 may be positioned outside the inner device 218 such that the interdigitated electrodes 236 are facing interior surfaces of the outer device 216 while the heating element 238 that is formed on the opposite surface is pressed against an outer surface of the inner device 218. By positioning the sensor element 234 on the outside of the inner device 218, it is separated from the flow tube 206, and as such, issues of water droplets and larger contaminants impinging on the sensor element and causing fluctuations in the sensor output may be reduced. The description of the electric circuit and the composition of the sensor element and the substrate are common to FIG. 4.

Turning now to FIG. 3, a schematic view 300 shows exhaust flow through the PM sensor assembly 202. Specifically, view 300 depicts exhaust flowing into the PM sensor assembly 202 via the flow tube 206 located between curved inner and outer surfaces of the outer device 216 and inner device 218, respectively. Herein, the flow tube 206 is configured to receive exhaust from the exhaust passage 210 and direct the exhaust into the interior chamber 242 formed inside the inner device 218. Directing the exhaust into the interior chamber 242 includes reversing a flow of exhaust gas as indicated by arrow 279 and then through the flow tube 206 and into the interior chamber 242, as indicated by arrow 280. In particular, the exhaust enters the flow tube 206 a direction oblique and/or opposite to the direction of exhaust flow (indicated by arrow 258) inside the exhaust passage 210. As such, larger or heavier contaminants and/or water droplets 274 (such as particulates having a larger than threshold size or weight) in the exhaust may gravitate towards the bottom 214 of the exhaust passage 210 and have a momentum too great to be able to turn around and enter the flow tube 206.

As explained previously with reference to FIG. 2, the inner device 218 is sealed expect for the cutout corresponding to the flow tube 206 and the inner device outlet 244. Therefore, the exhaust inside the interior chamber 242 is forced to travel toward the top portion 261 of the spherical assembly 204. Specifically, the exhaust flows in a direction perpendicular (as indicated by arrow 281) to the direction of exhaust flow inside the exhaust passage 210 (as indicated by arrows 258). It will be appreciated that exhaust arrow 281 may also swirl and/or flow annularly within the interior chamber 242, however, its general direction of flow is parallel to arrow 281 depicted in FIG. 3. The exhaust then flows annularly outward, as indicated by arrows 282 into the annular space 224 via the inner device outlet 244, as indicated by arrows 281. In the schematic view 300, the annular space 224 is an annulus formed between the inner 218 and the outer 216 devices and thus, the annular space 224 may function as a flow chamber between the inner 218 and outer 216 devices. The exhaust inside the annular space 224 flows around the inner device 218 in a downward direction toward the bottom portion 262 of the spherical assembly 204.

Specifically, the exhaust inside the annular space 224 flows annularly downward in a direction orthogonal to arrows 258 and opposite arrow 281 (as indicated by arrow 283). The exhaust flows through the narrowest gap 226 between the outer 216 and inner 218 devices before flow passed the sensor element 234. The positioning of the outer device outlet 244 with respect to the sensor element 234 has several advantages. Firstly, the outer device outlet 244 is positioned along a most constricted portion of the exhaust passage 210, thereby promoting the exhaust flow depicted. Secondly, the sensor element 234 is positioned above the outer device outlet 244 such that exhaust gas flowing toward the outer device outlet 244 at least flows through a horizontal plane of the sensor element 234 (e.g., along the X"-X'" axis). As a result, the sensor element 234 may accurately estimate PM in the exhaust flow while receiving even PM deposition due to the annularly downward direction of exhaust flow in the annular space 224.

In one example, the annular space 224 is venturi shaped adjacent to the inner device 218, where the narrowest gap 226 corresponds to a venturi throat. As such, exhaust gas flow exiting the inner device outlet 244 (indicated by arrows 282) may have an equal exhaust mass flow through the annular space 224. Said another way, exhaust gas dispersion across a face of the sensor element 234 may be substantially uniform (as shown by arrows 283), where a relationship between the outer 216 and inner 218 devices substantially prevents uneven exhaust flow across the sensor element. The exhaust is directed in a direction that is perpendicular to the horizontal plane of the sensor element 234 (which is along X-axis, for example). It may be appreciated that the exhaust is directed towards the first surface including the electrode and not towards the second surface of the sensor element 234 that includes the heating element 238. This is because the heating element 238 is pressed against outer surfaces of the inner device 218 and is not exposed to the annular space 224 like the electrodes 236. Soot particulates in the exhaust are accumulated between the interdigitated electrodes 236 of the sensor element 234 as described previously. Exhaust inside the annular space 224 is then directed toward the outer device outlet 246, where the exhaust gas flows out of the spherical assembly 204 and into the exhaust passage 210. Exhaust gas flowing through the outer device outlet 246 initially flows in a direction perpendicular to the direction of exhaust gas flow in the exhaust passage 210 (arrows 258) before turning in a direction parallel to arrows 258, as shown by arrows 284. The exhaust gas exiting the spherical assembly 204 combines with exhaust gas in the exhaust passage, indicated by arrows 258 and arrows 284.

To summarize, exhaust flows passed the outer device outlet due to a venturi shape of the exhaust passage adjacent the spherical assembly. The exhaust then flows through the flow tube in a direction oblique and/or opposite to its initial flow, and enters and interior chamber of the inner device. The exhaust in the interior chamber is then directed toward a portion of the annular space located near the top portion of the spherical assembly. The exhaust gas flows annularly, in a downward direction through the annular space. The exhaust gas at least flows through a plane of the sensor element, if not, passing over the sensor element before flowing to a region of the annular space below the inner device. As such, the sensor element captures PM from portions of the exhaust gas before the exhaust gas may exit the spherical assembly via the outer device outlet 246.

Thus, an example particulate matter sensor, comprising a pair of interdigitated electrodes formed on a first surface of a cylindrical sensor element, a heating element formed on a second surface of the cylindrical sensor element, the second surface opposite the first surface, and a flow tube and a stand-off suspending an inner device within an outer device of a spherical assembly, wherein the inner device is completely spaced away from the outer device via an annular space. Additionally or alternatively, the second surface of the cylindrical sensor element may be pressed against an outer surface of the inner device, and where the first surface of the sensor element is exposed to the annular space. Additionally or alternatively, the flow tube is configured to direct exhaust gas from downstream of the spherical assembly to an interior chamber positioned within the inner device, and where the stand-off is impervious to exhaust gas flow. Additionally or alternatively, the spherical assembly is fixed within an exhaust passage via a support rod extending from a top of the exhaust passage along a vertical axis. Additionally or alternatively, the inner device is oblong and the outer device is spherical, and where a center of the inner device is offset with a center of the outer device. Additionally or alternatively, the sensor element is located around a greatest circumference of the inner device downstream of a narrowest gap between the outer and inner devices. Additionally or alternatively, the spherical assembly constricts an exhaust passage, forming a venturi throat at an outer device outlet of the outer device. Additionally or alternatively, the outer device and inner device comprise no other inlet and additional outlets other than flow tube, inner device outlet, and outer device outlet.

Turning now to FIG. 4, a schematic view 400 of the sensor element 234 of FIG. 2 and an accompanying electric circuit 414 is shown. Specifically, circular interdigitated electrodes formed on a circular substrate 240 are shown. Since the protection assembly is spherical in shape, it may be advantageous to include a circular substrate for the sensor element to increase the surface area available for soot particulate adsorption. However, various other geometries of the substrate and the electrode layout may be possible without deviating from the scope of the invention. Some example layouts include rectangular or square substrate with interdigitated comb electrodes.

In view 400, the substrate 240 of the sensor element 234 is circular with radius $R_3$, which is less than $R_1$ and greater than $R_2$ of the outer 216 and inner 218 devices of FIG. 2. The substrate 240 of the sensor element 234 may be manufactured from electrically insulating materials. Some examples of possible electrically insulating materials may include oxides such as alumina, zirconia, yttria, lanthanum oxide, silica, and combinations comprising at least one of the foregoing, or any like material capable of inhibiting electrical communication and providing physical protection for the electrodes 406 and 408. In some examples, the substrate 240 may be composed of a porous ceramic material (e.g., porosity of about 60%). The radius $R_3$ of the circular substrate 240 may be determined based on the radius $R_2$ of the inner device 218.

The sensor electrode 236 includes a pair of circular interdigitated electrodes 406 and 408 formed on one surface of the sensor element 234. Herein, the pair of planar interdigitated electrodes 406 and 408 may form circular interdigitated tines indicated by solid and dotted lines in view 400, respectively. These electrodes may be typically manufactured from metals such as platinum, gold, osmium, rhodium, iridium, ruthenium, aluminum, titanium, zirconium, and the like, as well as, oxides, cements, alloys and combination comprising at least one of the foregoing metals. Each electrode of the interdigitated pair may be composed of the same or different material as the other electrode of the pair. For example, the electrode 406 may be composed of the same material as the electrode 408. In another example, electrode 406 and electrode 408 may be composed of different materials. The spacing between the circular "tines" of the two electrodes may typically be in the range from 30 micrometers to 50 micrometers with the linewidth of each individual "tine" being about the same value, although the latter may be excluded.

The electrodes 406 and 408 may be connected via electrical connections to an electric circuit 414. The electrode 408 of the sensor element 234 is connected with connecting wire 412 to a positive terminal of a voltage source 416 of the electric circuit 414. Thus, the electrode 408 may be referred to as a positive electrode. Similarly, the electrode 406 of the sensor element 234 is connected to a measurement device 418 via a connecting wire 410, and further connected to a negative terminal of the voltage source 416 of the electric circuit 414. Thus, the electrode 306 may be referred to as a negative electrode. The interconnecting wires 410 and 412, the voltage source 416 and the measurement device 418 are part of the electric circuit 414 and are housed outside the exhaust passage 210 (as one example, <1 meter away). Further, the voltage source 416 and the measurement device 418 of the electric circuit 414 may be controlled by a controller, such as controller 12 of FIG. 1, so that particulate matter collected at the PM sensor assembly 202 may be used for diagnosing leaks in the DPF, for example. As such, the measurement device 418 may be any device capable of reading a resistance (or current) change across the electrodes, such as a voltmeter (or an ammeter). As PM or soot particles get deposited between the electrodes 406 and 408, the current measured between the electrodes 406 and 408 may start to increase, which is measured by the measurement device 418. The controller 12 may be able to determine the current and infer a corresponding PM or soot load on the electrodes 406 and 408 of the sensor element 234 of the PM sensor assembly 202. By monitoring the load on the sensor element 234, the exhaust soot load downstream of the DPF may be determined, and thereby used to diagnose and monitor the health and functioning of the DPF.

In view 400, electrode 406 includes a plurality of circular tines of equal diameter wrapping around the substrate 240. The electrode 406 (interchangeably referred to as the negative electrode) includes a substantially straight portion 420 connecting the electrode 406 to the interconnecting wire 410. Herein, the straight portion 420 may extend between edges (located on the circumference, for example) of the substrate 240. As an example, a length of the straight portion 420 may be slightly less than a height of the substrate along the y-axis. The electrode 406 may additionally include a plurality of discrete curved portions 424 starting at certain locations along the straight portion 420 running clockwise along the surface of the substrate 240 and ending at a distance from the straight portion 420. Herein, each curved portion 424 corresponds to a major arc of a circle of certain radius slightly larger than $R_3$ with center coinciding with the center of the substrate 240, for example. Each curved portion 424 of the electrode 406 is substantially identical. Additionally, the curved portions 424 are cascaded along the height of the substrate 234 in the direction of gravity 299.

Similar to the negative electrode 406, the electrode 408 may include a plurality of circular tines of substantially equal in diameter. The electrode 408 (interchangeably referred to as the positive electrode) includes a substantially straight portion 422 connecting the positive electrode 408 to the interconnecting wire 412. Herein, the straight portion 422 may be parallel to the straight portion 420 of the negative electrode 406 and may extend between top and bottom edges of the substrate 240. As an example, a length of the straight portion 422 of the positive electrode 408 may be equal to or lesser than or greater than the length of the straight portion 420 of the negative electrode 406. The positive electrode 408 may additionally include a plurality of discrete curved portions 426 starting at certain locations along the straight portion 422 running counter-clockwise along the surface of the substrate 240 (away from the straight portion 420 of the negative electrode 406) and ending at a distance from the straight portion 420.

In one example, the spacing, w between the negative electrodes may be equal to the spacing, w' between the positive electrodes. In another example, the spacing w may be different from the spacing w'. As mentioned earlier, various geometries of the interdigitated electrodes may be possible. A spacing, x between the negative 406 and positive 408 is substantially constant between each iteration of the curved portions 424 and 426. In one example, when PM sufficiently accumulates and spans the entire spacing, x, then the negative and positive electrodes are electrically coupled, as will be described below.

Figure 5:
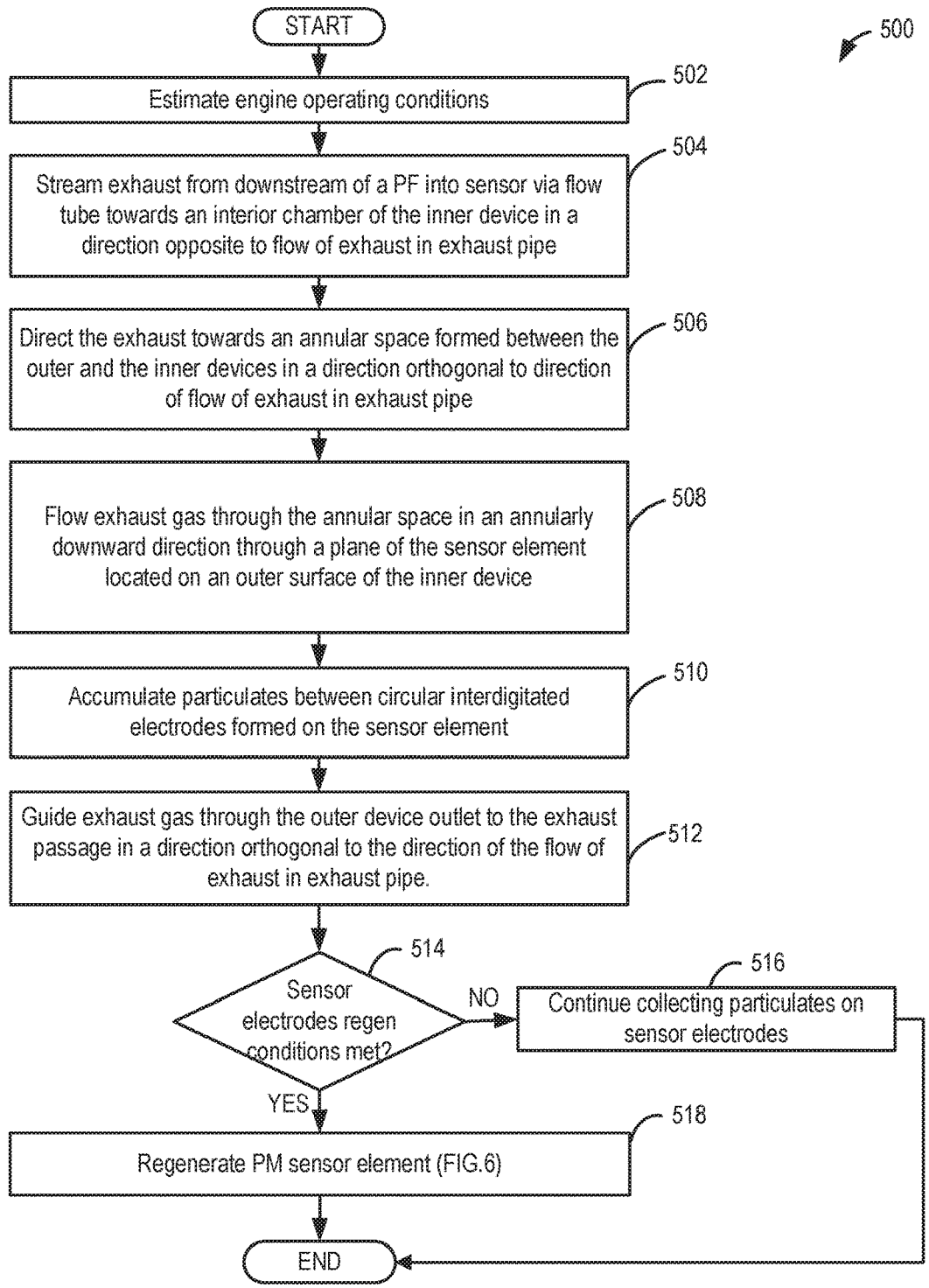
FIG. 5 shows a flow chart depicting an example method for accumulating particulates in the exhaust flow across the sensor element positioned within an inner device of the spherical assembly of the PM sensor.

Turning now to FIG. 5, a method 500 for accumulating particulates in the exhaust flow across sensor electrodes positioned within the PM sensor (such as a PM sensor 106 shown at FIG. 1, and/or PM sensor assembly 202 of FIG. 2, for example) is shown. Specifically, the particulates in the exhaust flow may be accumulated across interdigitated electrodes formed on a circular surface of a cylindrical substrate and positioned within a spherical assembly of the PM sensor. Herein, the spherical assembly includes an inner oblong device positioned within an outer spherical device and separated by a gap. In addition, the spherical assembly includes a flow tube attached to a downstream surface to direct exhaust in and out of the spherical assembly.

Instructions for carrying out method 500 and the rest of the methods 600 and 700 included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 502, method 500 includes determining and/or estimating engine-operating conditions. Engine operating conditions determined may include, for example, engine speed, exhaust flow rate, engine temperature, exhaust air-fuel ratio, exhaust temperature, duration (or distance) elapsed since a last regeneration of the DPF, PM load on PM sensor, boost level, ambient conditions such as barometric pressure and ambient temperature, etc.

Method 500 proceeds to 504 where a portion of exhaust flowing from downstream of a particulate filter (such as DPF 102 of FIG. 1) is directed into a PM sensor via a flow tube. Herein, the flow tube is a cylindrical tube located between the curved surfaces of the inner device and the outer device. As explained earlier, the flow tube and a stand-off mount the inner device within the outer device. Unlike the stand-off, the flow tube is configured to receive exhaust gas from the exhaust passage and direct it to the inner device. The direction of flow of exhaust into the flow tube is opposite to the direction of flow of exhaust inside the exhaust pipe, for example.

Next, method 500 proceeds to 506. At 506, method 500 includes directing the exhaust towards an annular space formed between the outer and the inner devices in a direction orthogonal to direction of flow of exhaust in exhaust passage. As described above, exhaust gas flows from the interior chamber of the inner device to the annular space via an inner device outlet located near the top portion of the outer device. As such, exhaust gas is forced to flow through a majority of a height of the interior chamber before flowing to the annular space.

Method 500 proceeds to 508. At 508, method 500 includes flowing exhaust gas through the annular space in an annularly downward direction through a plane of the sensor element located on an outer surface of the inner device. The sensor element is physically coupled around the circumference corresponding to a greatest diameter of the inner device. As such, the circumference of the sensor element is correspondingly larger than the greatest circumference of the inner device. As described above, the heating element of the sensor element is pressed against an outer surface of the inner device and the electrodes are exposed to exhaust gas in the annular space. Method 500 proceeds to 510.

At 510, method 500 includes accumulating particulates between circular interdigitated electrodes formed on the sensor element. Specifically, at 510, particulates in the annular space are directed towards the electrodes of the sensor element and the particulates are deposited across the electrodes. The direction of exhaust flow in the annular space is orthogonal to the direction exhaust flow inside the exhaust passage. As described previously, the sensor element including interdigitated electrodes is positioned above the center, C of the outer device. The positive electrodes are connected to the positive terminal of a voltage supply and the negative electrodes are connected to a measurement device and then to the negative terminal of the voltage supply. When the controller applies a voltage to the sensor electrodes, particulates inside the annular space may experience a strong electric field, enabling them to be accumulated between the electrodes. In addition, a load on the sensor electrodes is estimated based on a current generated in the sensor electrodes. When particulates accumulate on the surface of the sensor electrodes, the resistance of the electrodes starts decreasing and a current measured by the measurement device starts to increase. The controller may be able to deduce a load on the sensor electrodes based on the current measured across the electrodes. Method 500 then proceeds to 512.

At 512, method 500 includes guiding exhaust gas through the outer device outlet to the exhaust passage in a direction orthogonal to the direction of the flow of exhaust in exhaust pipe. Exhaust gas flow through the outer device outlet may be promoted via a lower static pressure adjacent to the outer device outlet due to a constriction of the exhaust passage adjacent to the spherical assembly. Method 500 then proceeds to 514.

At 514, method 500 includes intermittently checking if the sensor electrode has met the regeneration conditions. Specifically, when the soot load on the PM sensor is greater than the threshold, or when a resistance of the PM sensor (adjusted for temperature) drops to a threshold resistance, or when a current of the PM sensor is greater than a threshold current, PM sensor regeneration conditions may be considered met. In some examples, if a threshold time has elapsed since an immediately previous sensor regeneration, regeneration condition may be considered met. The PM sensor may demand regeneration to enable further PM detection.

Figure 6:
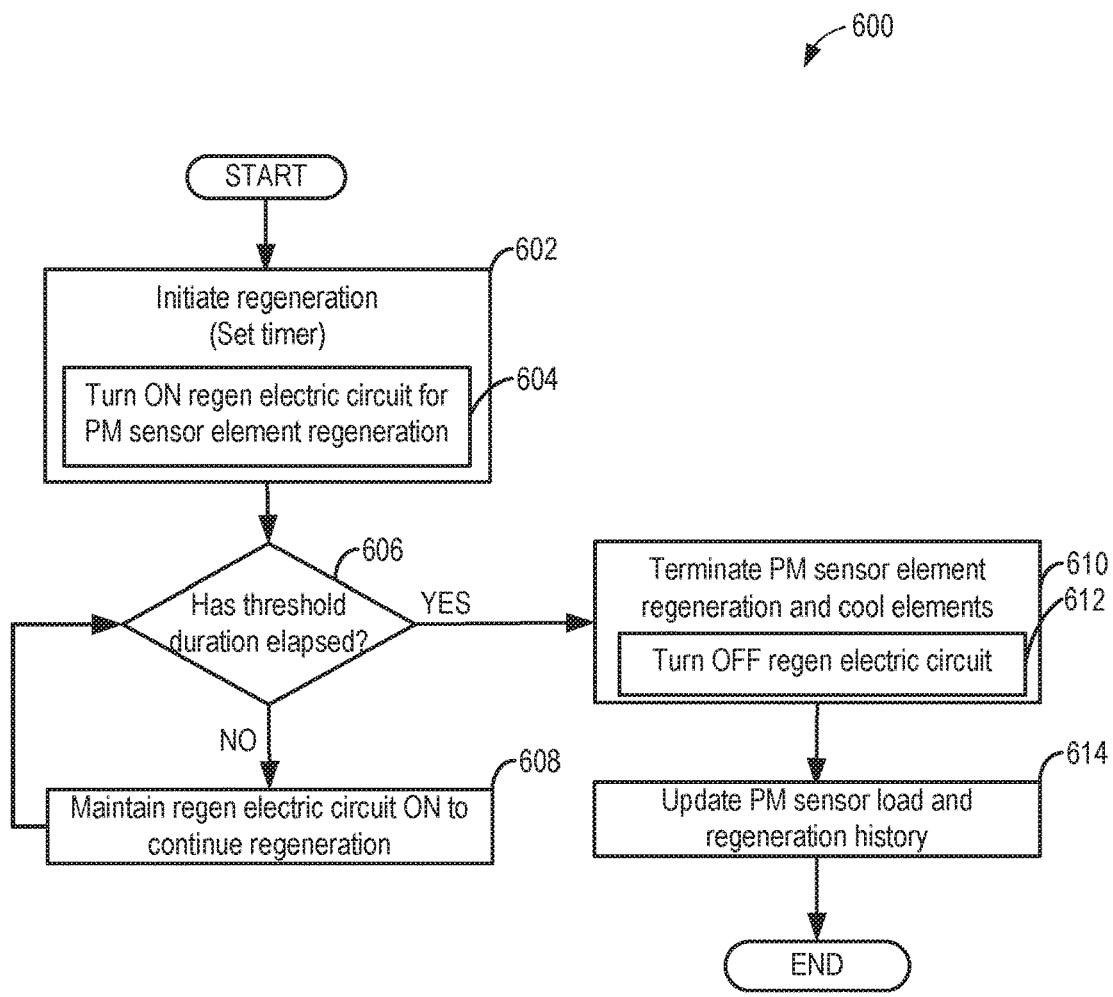
FIG. 6 is a flow chart depicting an example method for regenerating the sensor electrodes of the PM sensor.

If regeneration conditions are met (e.g., "YES" at 514), then method 500 proceeds to 518 where the PM sensor may be regenerated by performing a method described in FIG. 6. Briefly, regeneration of the PM sensor may be initiated by heating up the sensor. The PM sensor may be heated by actuating a heating element formed on a different surface of the sensor element that is opposite to the surface including the electrodes, for example. Herein, the controller may close the switch in a regeneration circuit, thereby applying a voltage to the heating element, causing the heating elements to heat up. Further, the controller may not apply voltages to the sensor electrodes while regenerating the sensor. Thus, the sensor electrodes may not accumulate soot during the sensor regeneration. As such, the heating element may be actuated until the soot load of the sensor has been sufficiently reduced by oxidation of the carbon particles between the electrodes. However, if PM sensor regeneration conditions are not met (e.g., "NO" at 514), then method proceeds to 516 where the particulates may continue to be collected on the sensor electrodes and the method ends.

Thus, an example method may include streaming exhaust from downstream of a particulate filter into an exhaust sensor assembly via a flow tube positioned between inner and outer devices in a direction opposite to flow of exhaust in an exhaust pipe, the flow tube coupled to downstream surfaces of the inner and outer devices. The example method further includes directing the exhaust towards an interior chamber in the inner device before flowing the exhaust to an annular space located between the inner and outer devices, where the exhaust flows in a direction orthogonal to the flow of exhaust in the exhaust pipe. Additionally or alternatively, the method may further include flowing the exhaust gas in the annular space over a sensor element coupled to a surface of the inner device outside the interior chamber. Additionally or alternatively, the method may further include where the flow tube and an outer device outlet are located in a lower half of the outer device and the sensor element is located in an upper half of the outer device. Additionally or alternatively, the method may further include where the flow tube is fluidly couples the interior chamber to the exhaust pipe, further comprising an inner device outlet fluidly coupling the interior chamber to the annular space in an upper half of the outer device.

Turning now to FIG. 6, a method 600 for regenerating the PM sensor (such as a PM sensor 106 shown at FIG. 1, and/or PM sensor assembly 202 of FIG. 2, for example) is shown. Specifically, when the soot load on the PM sensor is greater than the threshold, or when a resistance of the PM sensor adjusted for temperature drops to a threshold resistance, the PM sensor regeneration conditions may be considered met, and the PM sensor may demand regeneration to enable further PM detection. At 602, regeneration of the PM sensor may be initiated and the PM sensor may be regenerated by heating up the sensor at 604. The PM sensor may be heated by actuating a heating element until the soot load of the sensor has been sufficiently reduced by oxidation of the carbon particles between the electrodes. The PM sensor regeneration is typically controlled by using timers and the timer may be set for a threshold duration at 602. Alternatively, the sensor regeneration may be controlled using a temperature measurement of the sensor tip, or by the control of power to the heater, or any or all of these. When a timer is used for PM sensor regeneration, then method 600 includes checking if the threshold duration has elapsed at 606. If the threshold duration has not elapsed (e.g., "NO" at 606), then method 600 proceeds to 608 where the regeneration circuit may be kept ON to continue regeneration and the method ends. The method 600 may continue to monitor the regeneration duration if the threshold duration has not elapsed and the regeneration circuit is kept ON. If threshold duration has elapsed (e.g., "YES" at 606), then method 600 proceeds to 610 where the PM sensor regeneration may be terminated and the electric circuit may be turned off at 612. Further, the sensor electrodes may be cooled to the exhaust temperature for example. Method 600 proceeds to 614 where the PM sensor load and regeneration history may be updated and stored in memory. For example, a frequency of PM sensor regeneration and/or an average duration between sensor regenerations may be updated and the method ends.

In some examples, additionally or alternatively, a voltage provided to the heating element to regenerate the sensor substrate may be decreased as an engine load increases. For example, if an engine load is a high-load, then the controller signals to an actuator to provide less voltage to the heating element, thereby consuming less power. Regeneration of the sensor substrate may still be achieved due to the exhaust gas flowing through the PM sensor assembly. Further, due to the proximity of the sensor substrate to the outer device, along with the constriction of the annular space between the sensor substrate and the outer device, the heat and velocity of exhaust gas through the annular space may still promote regeneration and/or removal of the particulates. For example, the exhaust velocity and heat may more easily dislodge the particulates than a low engine load. Further, more oxygen may flow through the PM sensor assembly, thereby increasing a likelihood of burning the particulates, even with less voltage being provided to the heating element. As such, during an engine load where the load is a low-load, the controller may signal to the actuator of the heating element to provide full voltage due to decreased exhaust gas flow and temperatures. Thus, the heating element gets hotter during low engine loads than higher engine loads. In this way, power consumption of the heating element during regenerations in higher engine loads may be decreases.

The engine exhaust passage may include one or more PM sensors positioned upstream and/or downstream of the DPF for determining a soot load of the DPF. When the PM sensor is positioned upstream of the DPF, based on the resistance change following soot deposited on the plurality of electrodes of the PM sensor, a soot load on the sensor may be inferred. The soot load thus determined, may be used to update the soot load on the DPF, for example. If the soot load on the DPF is greater than a threshold for DPF regeneration, then the controller may adjust engine-operating parameters to regenerate the DPF. Specifically, responsive to filter regeneration conditions being met, a temperature of the filter (or in the vicinity of the filter) may be sufficiently raised to burn off stored soot. This may include operating a heater coupled to the DPF, or raising a temperature of engine exhaust (e.g., by operating rich) flowed into the DPF.

Figure 7:
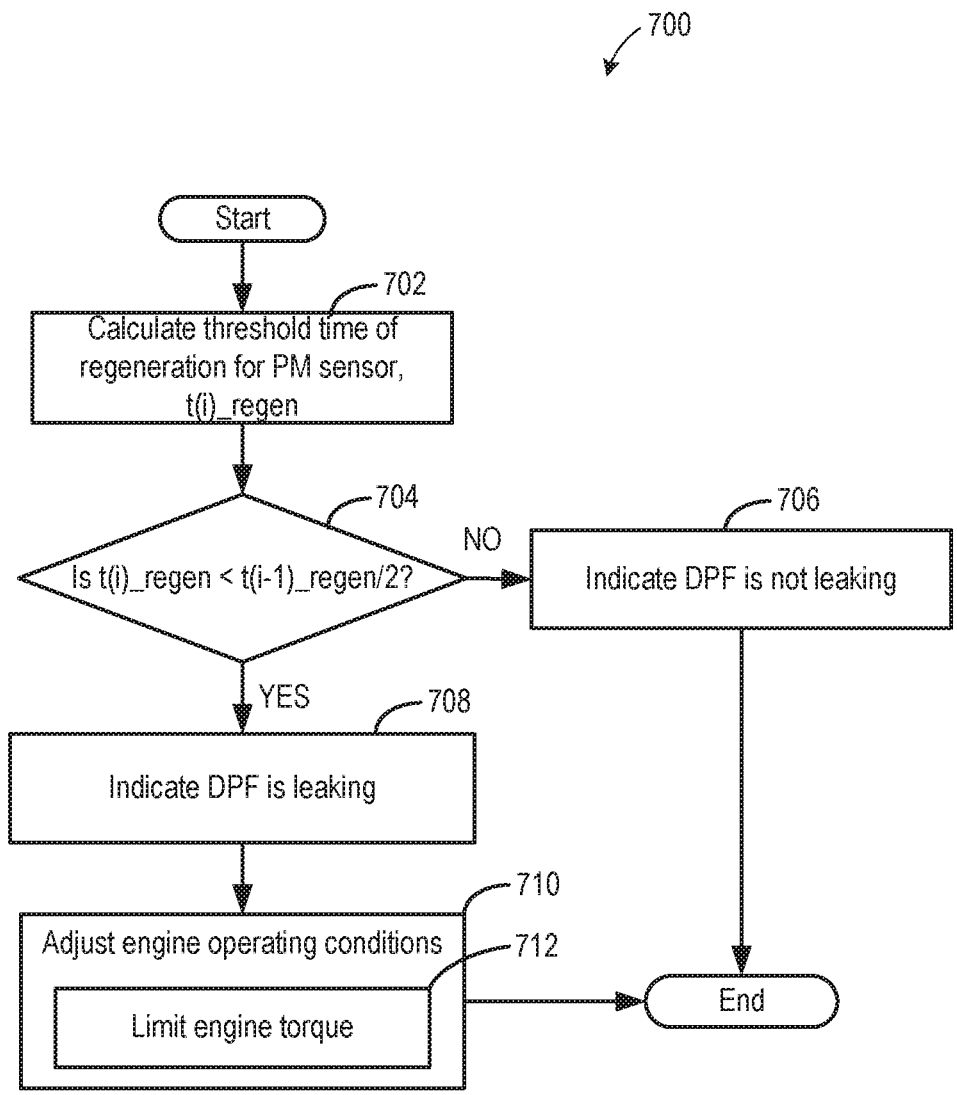
FIG. 7 shows a flow chart depicting an example method for diagnosing leaks in a particulate filter positioned upstream of the PM sensor.
Figure 8:
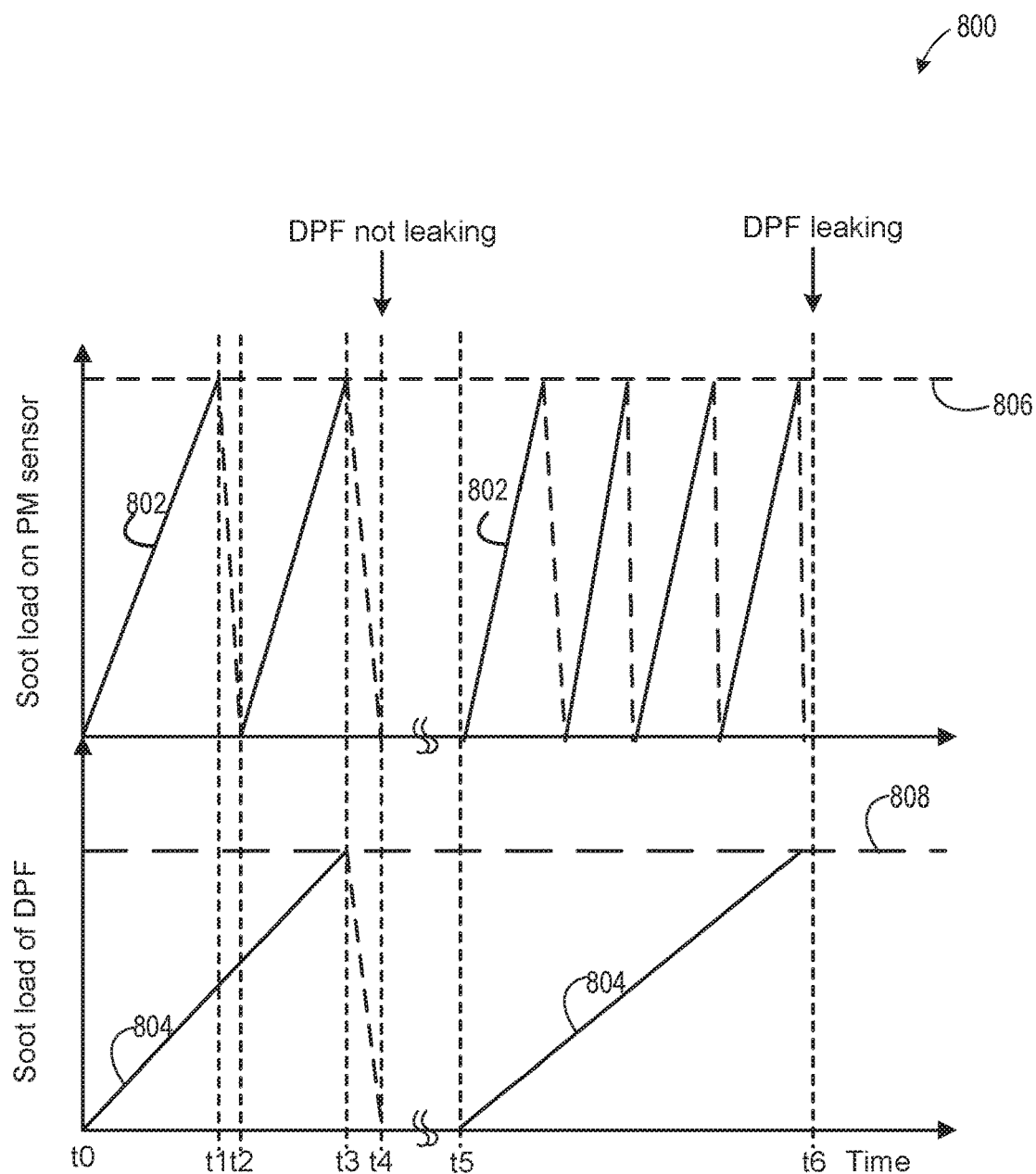
FIG. 8 shows an example relationship between a soot load on the PM sensor, and a soot load on a particulate filter positioned upstream of the PM sensor.

Turning now to FIG. 7, an example method 700 for diagnosing DPF function based on the regeneration time of the PM sensor is shown. At 702, it may be calculated by the controller, through calibration, the time of regeneration for the PM sensor, t(i)_regen, which is the time measured from end of previous regeneration to the start of current regeneration of the PM sensor. At 704, compare t(i)_regen to t(i−1)_regen, which is the previously calibrated time of regeneration of the PM sensor. From this, it may be inferred that the soot sensor may cycle through regeneration multiple times in order to diagnose the DPF. If the t(i)_regen is less than half the value of t(i−1) region, then at 708 indicate DPF is leaking, and DPF degradation signal is initiated. Alternatively, or additionally to the process mentioned above, the DPF may be diagnosed using other parameters, such as exhaust temperature, engine speed/load, etc. The degradation signal may be initiated by, for example, a malfunction indication light on diagnostic code. In addition, method 700 includes adjusting engine operation based on indicating leak in the DPF at 710. Adjusting engine operation may include limiting engine torque at 712, for example. In one example, responsive to detecting leak in the DPF, engine power and torque may be reduced. Reducing the engine power and torque may reduce the amount of PM emissions in the exhaust. For example, adjusting engine operation may include reducing fuel injected in a diesel engine under heavy load conditions thereby reducing torque. Additionally or alternatively, responsive to detecting leak in the DPF, an EGR usage may be decreased. Additionally or alternatively, an engine warning sign will appear on the dashboard to indicate the maximal distance vehicle can drive before DPF service check.

A current regeneration time of less than half of the previous regeneration time may indicate that the time for electric circuit to reach the R_regen threshold is significantly shorter, and thus the frequency of regeneration is higher. Higher frequency of regeneration in the PM sensor may indicate that the outflowing exhaust gas is composed of a higher amount of particulate matter than realized with a normally functionally DPF. Thus, if the change of regeneration time in the soot sensor reaches threshold, t_regen, in which the current regeneration time of the PM sensor is less than half of that of the previous regeneration time, a DPF degradation, or leaking, is indicated, for example via a display to an operator, and/or via setting a flag stored in non-transitory memory coupled to the processor, which may be sent to a diagnostic tool coupled to the processor. If the change in regeneration time of the soot sensor does not reach threshold t_regen, then at 706 DPF leaking is not indicated. In this way, leaks in a particulate filter positioned upstream of the particulate matter sensor may be detected based on a rate of deposition of the particulates on the particulate matter sensor electrodes.

Turning now to FIG. 8, map 800 shows an example relationship between soot load on the PM sensor and the soot load on the particulate filter. Specifically, map 800 shows a graphical depiction of the relationship between PM sensor regeneration and the soot load of the DPF, specifically how PM sensor regeneration may indicate DPF degradation. Vertical markers t0, t1, t2, t3, t4, t5, and t6 identify significant times in the operation and system of PM sensor and DPF.

The first plot of FIG. 8 shows a soot load on the PM sensor. As previously described, PM gets deposited across the circular positive and negative electrodes formed on a cylindrical substrate that is positioned inside an inner device closer to a hole formed at the bottom of the inner device, for example. As soot gets accumulated, a current measured across the electrodes beings to increase (or a resistance of the electrodes begins to decrease). The controller may be able to determine a soot load (plot 802) based on the current/resistance measured. As such, the soot load is at its lowest value at the bottom of the plots and increases in magnitude toward the top of the plot in the vertical direction. The horizontal direction represents time and time increases from the left to the right side of the plot. Horizontal marker 806 represents the threshold load for regeneration of the PM sensor in the top plot. Plot 804 represents the soot load on the DPF, and the horizontal marker 808 represents the threshold soot load of DPF in the second plot.

Between t0 and t1, a PM sensor regeneration cycle is shown. At time t0, the PM sensor is in a relatively clean condition, as measured by low PM load (plot 802). A controller coupled to the PM sensor determines the soot load of the PM sensor based on the current/resistance measured across the sensor electrodes, for example. When the controller determines the soot load to be small, it may send instructions to a regeneration circuit to end supplying heat, so that a detection circuit may begin detecting PM load accumulation. As PM load increases on the sensor, soot gets accumulated in the gap between the sensor electrodes.

Between t0 and t1, as PM continues to accumulate, the soot load (plot 802) increases accordingly and further soot load on DPF also increases (plot 804). In some examples, soot load on the DPF may be based on PM sensor load when PM sensor is located upstream of DPF, for example.

At t1, the soot load on the PM sensor (plot 802) reaches the threshold load for regeneration of the PM sensor (marker 806). The threshold load may a load at which the sensor may demand regeneration. At t1, PM sensor regeneration may be initiated as explained earlier. Briefly, the controller may close a switch in the electric circuit to apply voltage to the heating elements formed along the inner surface of the central element, for example. In addition, the PM sensor may not be operated in PM accumulation mode, thus the controller may not apply any voltage to the sensor electrodes.

Thus, between t1 and t2, the PM sensor may be regenerated by turning on the electric circuit for regeneration. At t2, the PM sensor may be sufficiently cool, and may begin to accumulate soot and continue accumulating between t2 and t3 (DPF regeneration cycle), for example. During time between t2 and t3, DPF soot load continues to increase (plot 804). However, at t3, the soot load on the DPF (plot 804) reaches the threshold soot load for DPF regeneration (marker 808). Between t3 and t4, the DPF may be regenerated to burn off the soot deposited on the DPF. Further at t4, the PM sensor regeneration frequency may be compared with a previously estimated regeneration frequency of the PM sensor. Based on the PM sensor regeneration frequency remaining similar to previous cycles, the DPF may be determined to be not leaking. In this way, based on PM sensor output, DPF health may be monitored and diagnosed for leaks.

Between t5 and t6, another DPF cycle is shown. Herein, between t5 and t6, the soot load on the DPF gradually increases (plot 804). During this time, the soot load on the PM sensor (plot 802) may be monitored. Plot 802 shows the PM sensor going through multiple regeneration cycles as described earlier. However, the frequency of regeneration of the PM sensor has nearly doubled (plot 802). The higher frequency of regeneration in the PM sensor may indicate that the outflowing exhaust gas is composed of a higher amount of particulate matter than realized with a normally functional DPF. Therefore at t6, DPF leakage may be indicated.

In this way, a more accurate measure of the exhaust PM load, and thereby the DPF soot load can be determined. As such, this increases the efficiency of filter regeneration operations. In addition, by enabling more accurate diagnosis of an exhaust DPF, exhaust emissions compliance may be increased. As such, this reduces the high warranty costs of replacing functional particulate filters and exhaust component life is extended.

In this way, a sensor element may be shielded by one or more spherical protective tubes that further enhance uniform soot deposition. Exhaust gases may enter the sensor assembly via a flow tube located on a downstream surface of the spherical assembly. As such, the exhaust may undergo changes in flow direction which helps reduce flow rate. In addition, water droplets and larger contaminants flow passed the flow tube due to their greater momentum compared to smaller particulates. The exhaust gas is directed to the interior chamber of the inner device, where the exhaust gas is separated from the annular space and the sensor element. Exhaust gas then flows through the inner device outlet and into the annular space, where the exhaust gas may flow around the sensor element. In this way, by separating the interior chamber from the sensor element, issues of uneven soot deposition may be prevented due to the even flow induced by the annular space. Thus, the annular space between the inner and outer devices may be sized, shaped, and positioned to generate uniform flow of exhaust gases onto the sensor surface.

A technical effect of greater uniform flow impingement of sample gasses on a particulate matter sensor may be achieved by decreasing the flow speed of the exhaust gas. By interrupting the flow path of the exhaust gas, and decreasing its speed, the uniformity of the flow on the particulate matter sensor surface may be increased. Further still, by positioning the sensor element outside of the interior chamber in the annular space, exhaust gas is forced to flow passed the sensor element before it is expelled from the spherical assembly.

A particulate matter sensor assembly comprising a spherical assembly, an inner device positioned within an outer device of the spherical assembly, offset with a geometric center of the outer device, and a sensor element located on an outer surface of the inner device, proximal to a narrowest passage between the outer device and the inner device. A first example of the particulate matter sensor assembly further comprises where the inner device is rigidly mounted in the outer device via a flow tube and a support. A second example of the particulate matter sensor assembly, optionally including the first example, further includes where the flow tube is oblique to a vertical axis of the outer device and positioned against a downstream surface of the outer device relative to a direction of exhaust gas flow. A third example of the particulate matter sensor assembly, optionally including the first and/or second examples, further includes where the support is perpendicular to the flow tube and positioned against an upstream surface of the outer device, and where the support is solid and the flow tube is hollow. A fourth example of the particulate matter sensor assembly, optionally including one or more of the first through third examples, further includes where the sensor element is cylindrical and positioned around a greatest diameter of the inner device. A fifth example of the particulate matter sensor assembly, optionally including one or more of the first through fourth examples, further includes where the inner device comprises an interior chamber located therein, and the spherical assembly comprises an annular space located between the outer and inner devices, further comprising an inner device outlet fluidly coupling the interior chamber to the annular space. A sixth example of the particulate matter sensor assembly, optionally including one or more of the first through fifth examples, further comprising where the inner device comprises a first cutout corresponding to the inner device outlet near a top of the inner device and a second cutout corresponding to a flow tube near a bottom of the inner device. A seventh example of the particulate matter sensor assembly, optionally including one or more of the first through sixth examples, further comprising where the inner device is completely spaced away from and suspended within the outer device, and where the outer device is a sphere shape and the inner device is an oblong shape.

A particulate matter sensor comprising a pair of interdigitated electrodes formed on a first surface of a cylindrical sensor element, a heating element formed on a second surface of the cylindrical sensor element, the second surface opposite the first surface, and a flow tube and a stand-off suspending an inner device within an outer device of a spherical assembly, wherein the inner device is completely spaced away from the outer device via an annular space. A first example of the particulate matter sensor, further includes where the second surface of the cylindrical sensor element is pressed against an outer surface of the inner device, and where the first surface of the sensor element is exposed to the annular space. A second example of the particulate matter sensor, optionally including the first example, further includes where the flow tube is configured to direct exhaust gas from downstream of the spherical assembly to an interior chamber positioned within the inner device, and where the stand-off is impervious to exhaust gas flow. A third example of the particulate matter sensor, optionally including the first and/or second examples, further includes where the spherical assembly is fixed within an exhaust passage via a support rod extending from a top of the exhaust passage along a vertical axis. A fourth example of the particulate matter sensor, optionally including one or more of the first through third examples, further includes where the inner device is oblong and the outer device is spherical, and where a center of the inner device is offset with a center of the outer device. A fifth example of the particulate matter sensor, optionally including one or more of the first through fourth examples, further includes where the sensor element is located around a greatest circumference of the inner device downstream of a narrowest gap between the outer and inner devices. A sixth example of the particulate matter sensor, optionally including one or more of the first through fifth examples, further includes where the spherical assembly constricts an exhaust passage, forming a venturi throat at an outer device outlet of the outer device. A seventh example of the particulate matter sensor, optionally including one or more of the first through sixth examples, further includes where the outer device and inner device comprise no other inlet and additional outlets other than flow tube, inner device outlet, and outer device outlet.

A method comprising streaming exhaust from downstream of a particulate filter into an exhaust sensor assembly via a flow tube positioned between inner and outer devices in a direction opposite to flow of exhaust in an exhaust pipe, the flow tube coupled to downstream surfaces of the inner and outer devices and directing the exhaust towards an interior chamber in the inner device before flowing the exhaust to an annular space located between the inner and outer devices, where the exhaust flows in a direction orthogonal to the flow of exhaust in the exhaust pipe. A first example of the method further includes flowing the exhaust gas in the annular space over a sensor element coupled to a surface of the inner device outside the interior chamber. A second example of the method, optionally including the first example, further includes where the flow tube and an outer device outlet are located in a lower half of the outer device and the sensor element is located in an upper half of the outer device. A third example of the method, optionally including the first and/or second examples, further includes where the flow tube is fluidly couples the interior chamber to the exhaust pipe, further comprising an inner device outlet fluidly coupling the interior chamber to the annular space in an upper half of the outer device.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    streaming exhaust from downstream of a particulate filter into an exhaust sensor assembly via a flow tube positioned between inner and outer devices in a direction opposite to flow of exhaust in an exhaust pipe, the flow tube coupled to downstream surfaces of the inner and outer devices; and
    directing the exhaust towards an interior chamber in the inner device before flowing the exhaust to an annular space located between the inner and outer devices, wherein the exhaust flows in a direction orthogonal to the flow of exhaust in the exhaust pipe.

2. The method of claim 1, further comprising flowing the exhaust gas in the annular space over a sensor element coupled to a surface of the inner device outside the interior chamber.

3. The method of claim 2, wherein the flow tube and an outer device outlet are located in a lower half of the outer device and the sensor element is located in an upper half of the outer device.

4. The method of claim 1, wherein the flow tube fluidly couples the interior chamber to the exhaust pipe, and further comprising an inner device outlet fluidly coupling the interior chamber to the annular space in an upper half of the outer device.

5. The method of claim 2, wherein the sensor element is cylindrical, wherein a pair of interdigitated electrodes are formed on a first surface of the sensor element, and wherein a heating element is formed on a second surface of the sensor element, the second surface opposite the first surface.

6. The method of claim 1, wherein the exhaust sensor assembly is spherical and constricts an exhaust passage, forming a venturi throat at an outer device outlet of the outer device.

* * * * *